(12) United States Patent
Nagatoshi et al.

(10) Patent No.: US 8,299,150 B2
(45) Date of Patent: *Oct. 30, 2012

(54) AROMATIC POLYCARBONATE RESIN COMPOSITION AND MOLDING THEREOF

(75) Inventors: Kikuo Nagatoshi, Chiba (JP); Toshiya Abiko, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 874 days.

This patent is subject to a terminal disclaimer.

(21) Appl. No.: 11/722,435

(22) PCT Filed: Dec. 5, 2005

(86) PCT No.: PCT/JP2005/022297
§ 371 (c)(1),
(2), (4) Date: Jun. 21, 2007

(87) PCT Pub. No.: WO2006/067948
PCT Pub. Date: Jun. 29, 2006

(65) Prior Publication Data
US 2010/0016489 A1 Jan. 21, 2010

(30) Foreign Application Priority Data
Dec. 21, 2004 (JP) ................. 2004-368994

(51) Int. Cl.
*C08K 5/521* (2006.01)
(52) U.S. Cl. ........ 524/140; 524/141; 524/449; 524/450; 524/451; 524/456
(58) Field of Classification Search .................. 524/140, 524/141, 145, 445–451, 495; 568/14
See application file for complete search history.

(56) References Cited

U.S. PATENT DOCUMENTS

| | | | | |
|---|---|---|---|---|
| 3,130,177 A * | 4/1964 | Grabowski | ....................... | 525/67 |
| 3,341,343 A * | 9/1967 | Beiswanger et al. | .... | 106/169.14 |
| 3,880,783 A * | 4/1975 | Serini et al. | ...................... | 525/67 |
| 4,390,657 A * | 6/1983 | Liu | ................................ | 524/504 |
| 4,450,249 A * | 5/1984 | Schmidt et al. | ................ | 524/132 |
| 5,162,419 A * | 11/1992 | Pottier-Metz et al. | ......... | 524/451 |
| 5,391,600 A * | 2/1995 | Umeda et al. | ................. | 524/267 |
| 5,451,632 A * | 9/1995 | Okumura et al. | ............. | 524/537 |
| 6,174,944 B1 * | 1/2001 | Chiba et al. | .................... | 524/127 |
| 6,362,269 B1 * | 3/2002 | Ishihata et al. | ................ | 524/449 |
| 2004/0147655 A1 * | 7/2004 | Sawaki et al. | ................. | 524/425 |
| 2005/0261414 A1 * | 11/2005 | Mitsuhashi et al. | .......... | 524/451 |
| 2007/0213437 A1 * | 9/2007 | Nagatoshi | ..................... | 524/146 |

FOREIGN PATENT DOCUMENTS

| | | |
|---|---|---|
| JP | 11 323119 | 11/1999 |
| JP | 2000 063651 | 2/2000 |
| JP | 2002 146198 | 5/2002 |
| JP | 2002 194227 | 7/2002 |
| JP | 2003-317704 | 11/2003 |
| JP | 2004-155928 | 6/2004 |
| JP | 2005 298562 | 10/2005 |
| JP | 2005 307000 | 11/2005 |
| WO | WO 2004018561 A1 * | 3/2004 |

OTHER PUBLICATIONS

Machine language translation of JP 2002-194227.*
Kirk-Othmer Encyclopedia of Chemical Technology: Polycarbonate, 2001.*
Office Action issued on Jan. 4, 2011 in the corresponding Japanese Patent Application No. 2004-368994.

* cited by examiner

*Primary Examiner* — Peter Szekely
(74) *Attorney, Agent, or Firm* — Oblon, Spivak, McClelland, Maier & Neustadt, L.L.P.

(57) ABSTRACT

An aromatic polycarbonate resin composition exhibiting small molding shrinkage anisotropy, high dimensional stability, and high flowability, and a molded article produced therefrom, wherein the aromatic polycarbonate resin composition, and the molding thereof, each comprise 100 parts by mass of an admixture comprising: (A) 40-99 mass % aromatic polycarbonate resin, or a mixture of 60 mass % or more aromatic polycarbonate resin and 40 mass % or less flowability improver and/or impact modifier; (B) 60-1 mass % silicate-containing inorganic filler, or a mixture of 35 mass % or more silicate-containing inorganic filler and 65 mass % or less fibrous filler; and (C) 0.05-3 parts by mass of mono- or di-ester of phosphoric acid having a polyoxyalkylene alkyl ether or polyoxyalkylene alkylaryl ether group represented by formula $[R^1—O—(C_nH_{2n}O)_m]_{3-x}P(=O)—(OH)_x$, wherein $R^1$ represents an alkyl group having 1 to 18 carbon atoms or a substituted phenyl group having an alkyl group having 1 to 18 carbon atoms; n is 2 or 3; and x is 1 or 2.

15 Claims, No Drawings

AROMATIC POLYCARBONATE RESIN COMPOSITION AND MOLDING THEREOF

CROSS-REFERENCE TO RELATED APPLICATIONS

The present application is a 35 U.S.C. §371 National Stage patent application of International patent application PCT/JP05/022297, filed on Dec. 5, 2005, which claims priority to Japanese patent application JP 2004-368994, filed on Dec. 21, 2004.

TECHNICAL FIELD

The present invention relates to aromatic polycarbonate resin compositions and moldings thereof. In particular, the present invention relates to an aromatic polycarbonate resin composition that contains a polycarbonate resin of which a decrease in molecular weight is suppressed and molding thereof, the composition showing low shrinkage anisotropy, high dimensional stability, and high flowability.

BACKGROUND ART

In order to ensure rigidity and strength of housings and components of office automation equipment and electrical and electronic equipment and housings and bodies of cameras, polycarbonate (hereinafter referred to as PC) resin composition containing fillers such as glass fiber are used. Since the compositions have shrinkage anisotropy during molding, injection molding requires means for ensuring high dimensional accuracy. Use of flat fillers such as talc and mica to reduce such anisotropy is not practical because these fillers cause a decrease in molecular weight of the polycarbonate resin. Thus, PC resin compositions not causing a decrease in molecular weight of PC resins even if these inorganic fillers are compounded in large amounts are required.

For example, Patent Document 1 discloses a method of suppressing a decrease in molecular weight of a PC resin that contains phosphoric acid having a specific structure, in addition to four kinds of fillers, e.g., alumina, potassium titanate, talc, and iron and steel slag. This document discloses only examples having a filler content of 10%, but does not disclose the effect when larger amounts of fillers are compounded. According to the inventor's tracing experiments using talc-compounded compositions, color tone gets worse compared with filler-free compositions, although a decrease in molecular weight of PC resins was suppressed to a certain extent.

Patent Document 2 discloses a polycarbonate resin composition containing olefin wax having a carboxyl group, in addition to glass and metal flakes, mica, and talc, and showing improved rigidity and impact strength. This composition, containing only flat fillers, causes poor thermal characteristics such as low thermal deformation temperatures. Larger amounts of flat fillers must be compounded for rigidity comparable with that of compositions containing fibrous fillers. Compounding larger amounts of flat filers, however, will decrease flowability of PC resin compositions.

[Patent Document 1]
Japanese Patent Application Laid-Open No. Heisei 2 (1990)-283760

[Patent Document 2]
Japanese Patent Application Laid-Open No. Laid-Open 8 (1996)-188708

DISCLOSURE OF THE INVENTION

Problems to be Solved by the Invention

An object of the present invention, which has been accomplished under such circumstances, is to provide an aromatic PC resin composition that contains a PC resin of which a decrease in molecular weight is suppressed, the composition showing low shrinkage anisotropy, high dimensional stability, and high flowability, and to provide a molding made of the aromatic PC resin composition.

Means for Solving Problems

The inventors have extensively studied for solving the problems and have discovered that addition of a predetermined amount of specific phosphate ester to a PC resin composition primarily composed of an aromatic PC resin and a silicate-containing inorganic filler can suppress a decrease in molecular weight of the PC resin, significantly improves impact strength, and maintains high rigidity. The inventors have also discovered that such addition enhances whiteness and improves color difference of a white PC resin composition containing talc as a silicate-containing inorganic filler. Furthermore, the inventors have discovered that combined use of silicate-containing inorganic filler and a fibrous filler enhances rigidity and flowability and ensures low shrinkage anisotropy of the PC resin composition. The present invention has been completed under such findings.

The present invention provides a polycarbonate resin composition and a molding, as follows.

1. An aromatic polycarbonate resin composition comprising: 100 parts by mass of an admixture containing (A) 40 to 99 mass % aromatic polycarbonate resin or mixture of 60 mass % or more aromatic polycarbonate resin and 40 mass % or less flowability improver and/or impact modifier and (B) 60 to 1 mass % silicate-containing inorganic filler or mixture of 35 mass % or more silicate-containing inorganic filler and 65 mass % or less fibrous filler; and (C) 0.05 to 3 parts by mass of mono- or di-ester of phosphoric acid having a polyoxyalkylene alkyl ether or polyoxyalkylene alkylaryl ether group represented by formula (I):

$$[R^1-O-(C_nH_{2n}O)_m]_{3-x}P(=O)-(OH)_x \qquad (I)$$

wherein $R^1$ represents an alkyl group having 1 to 18 carbon atoms or a substituted phenyl group having an alkyl group having 1 to 18 carbon atoms; n is 2 or 3; and x is 1 or 2.

2. The aromatic polycarbonate resin composition according to aspect 1, wherein the flowability improver in the component (A) is at least one selected from a styrenic thermoplastic resin and a terpene resin.

3. The aromatic polycarbonate resin composition according to aspect 1 or 2, wherein the impact modifier in the component (A) is a core-shell-type graft elastomer and/or rubber-containing styrenic resin.

4. The aromatic polycarbonate resin composition according to any one of aspects 1 to 3, wherein the silicate-containing inorganic filler in the component (B) is at least one selected from talc, mica, zeolite, wollastonite, and lamellar silicates ion-exchanged with organic onium salts.

5. The aromatic polycarbonate resin composition according to any one of aspects 1 to 4, wherein the fibrous filler in the component (B) is at least one selected from glass fiber, carbon fiber, and aluminum borate whiskers.

6. An aromatic polycarbonate resin molding prepared by molding the aromatic polycarbonate resin composition according to any one of aspects 1 to 5.

EFFECTS OF THE INVENTION

Addition of the specific phosphate ester can suppress a decrease in molecular weight of a PC resin containing a large amount of silicate-containing inorganic filler and provides a PC resin composition showing significantly improved impact strength and high rigidity. Furthermore, a white PC resin composition containing talc as the silicate-containing inorganic filler shows high whiteness and improved color difference. In addition, combined use of the silicate-containing inorganic filler and the fibrous filler provides a PC resin composition having high rigidity, small shrinkage anisotropy during molding, and high flowability.

BEST MODES FOR CARRYING OUT THE INVENTION

In the PC resin composition in accordance with the present invention, the component (A) comprises an aromatic polycarbonate resin or a mixture of 60 mass % or more aromatic polycarbonate resin and 40 mass % or less flowability improver and/or impact modifier. The aromatic PC resin in the component (A) may have any chemical structure and may be produced by any method without restriction. For example, a preferred aromatic PC resin is produced by a reaction of a divalent phenol with a carbonate precursor.

Examples of preferred divalent phenols include 2,2-bis(4-hydroxyphenyl)propane, bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cyclohexane, bis(4-hydroxyphenyl)ether, bis(4-hydroxyphenyl) sulfide, bis(4-hydroxyphenyl) sulfone, bis(4-hydroxyphenyl) sulfoxide, bis(4-hydroxyphenyl) ketone, hydroquinone, resorcinol, and catechol.

Among these divalent phenols, bis(hydroxyphenyl)alkanes and particularly 2,2-bis(4-hydroxyphenyl)propane [Bisphenol A] is preferred. These divalent phenols may be used alone or in combination.

Examples of the carbonate precursor include carbonyl halides, carbonyl esters, and haloformates, and more specifically, phosgene, dihaloformates of divalent phenols, diphenyl carbonate, dimethyl carbonate, and diethyl carbonate.

The aromatic polycarbonate resin in the component (A) may have any chemical structure, for example, a linear, cyclic, or branched molecular structure.

Polycarbonate resins having branched structures may be preferably produced using branching agents, such as 1,1,1-tris(4-hydroxyphenyl)ethane, α,α',α"-tris(4-hydroxyphenyl)-1,3,5-triisopropylbenzene, fluoroglucine, trimellitic acid, and isatin-bis(o-cresol). The polycarbonate resin may be produced using bifunctional carboxylic acids such as terephthalic acid or ester precursors such as ester-forming derivatives of the bifunctional carboxylic acids. Alternatively, the polycarbonate resins having various chemical structures may be used in combination.

The viscosity average molecular weight of the polycarbonate resin ranges from, generally 10,000 to 50,000, preferably 13,000 to 35,000, more preferably 15,000 to 25,000. The viscosity average molecular weight (Mv) is calculated from the intrinsic viscosity [η] determined from the viscosity of a methylene chloride solution at 20° C. with a Ubbelohde viscometer using the equation: $[\eta]=1.23 \times 10^{-5} \text{ Mv}^{0.83}$. The molecular weight of the polycarbonate resin can be modified with, for example, phenol, p-tert-butylphenol, p-tert-octylphenol, or p-cumylphenol.

Furthermore, a polycarbonate-polyorganosiloxane copolymer (hereinafter, referred to as PC-POS copolymer) may be used as the aromatic PC resin in the component (A). This copolymer is prepared, for example, by dissolving a polycarbonate oligomer and a polyorganosiloxane having a terminal reactive group in a solvent such as methylene chloride, by adding an aqueous sodium hydroxide solution of a divalent phenol to the mixture, then by interfacial condensation polymerization using a catalyst such as triethylamine. Examples of preferred structure of the polyorganosiloxane include polydimethylsiloxane, polydiethylenesiloxane, polymethylphenylsiloxane, and polydiphenylsiloxane.

Preferably, the PC-POS copolymer should have a polycarbonate segment having a degree of polymerization of about 3 to 100 and a polyorganosiloxane segment having a degree of polymerization of about 2 to 500.

Preferably, the PC-POS copolymer should contain 0.5 to 30 mass %, more preferably 1 to 20 mass % polyorganosiloxane segment.

Preferably, the PC-POS copolymer should have a viscosity average molecular weight of 5,000 to 100,000 and more preferably 10,000 to 30,000.

Examples of the flowability improver in the component (A) include styrenic thermoplastic resins and terpene resins. Preferred styrenic thermoplastic resins are acrylonitrile-styrene resins. Preferably, the acrylonitrile-styrene resin should have a melt flow rate (MFR) of 5 g/10 min or more and more preferably 15 g/10 min or more at 200° C. under a load of 49N. A melt flow rate (MFR) of 5 g/10 min or more ensures satisfactory flowability.

The content of acrylonitrile segments in the acrylonitrile-styrene resin ranges from 15 to 40 mass % and preferably 20 to 30 mass %. An acrylonitrile content of 15 to 40 mass % maintains high compatibility between the polycarbonate and the acrylonitrile-styrene resin. This ensures high impact strength and prevents lamellar separation.

Typical examples of the acrylonitrile-styrene resin are acrylonitrile-styrene copolymers. Commercially available copolymers are, for example, BS-218 (made by NIPPON A&L INC.) and 290FF (made by Techno Polymer Co., Ltd.).

Examples of preferred terpene resins include terpene homopolymers, copolymers of terpene monomers and aromatic compounds, and hydrogenated terpene resins thereof. Examples of terpene monomers include αpinene, β-pinene, dipentene, and d-limonene. Examples of the aromatic compounds include vinyl-containing aromatic compounds, such as styrene, α-methylstyrene, and vinyltoluene; and phenols such as, phenol, cresols, and 2,2-bis(4-hydroxyphenyl)propane. These terpene monomers may be polymerized alone or copolymerized with the aromatic compounds in organic solvents in the presence of Friedel-Crafts catalysts.

Combined use of the aromatic PC resin and the flowability improver prevents lamellar separations and improves flowability of the PC resin composition while the flame resistance and the heat resistance of the composition are being maintained.

Preferably, the flowability improver should be contained in an amount of 40 mass % or less, more preferably, 30 mass % or less, and most preferably 20 mass % or less of the total amount of the aromatic PC resin and the flowability improver. A flowability improver content of 40 mass % or less of the total amount prevents a large decrease in impact strength.

Examples of the impact modifier in the component (A) include core-shell-type elastomers and rubber-modified styrenic resins. The core-shell-type elastomer has a double layer structure of a core and a shell, the core being composed of soft rubber whereas the shell being composed of hard resin. This elastomer is a powdered (granular) graft polymer.

The major proportion of this core-shell-type elastomer maintains its original powdered shape after it is blended with an aromatic polycarbonate resin. Since the major portion of the compounded core-shell-type elastomer maintains the original shape, the elastomer is uniformly dispersed. This is effective for prevention of surface separation.

Examples of commercially available core-shell-type elastomers include KM-330 (made by Rohm & Haas); METABLEN W529, METABLEN S2001, and METABLEN C223A (made by Mitsubishi Rayon Co. Ltd.); KM357P, EXL2315, and EXL2603 (made by Rohm & Haas Japan K.K.); and HIBLEN B621 (made by ZEON CORPORATION).

For example, such elastomers are prepared by polymerizing one or more vinyl monomers in the presence of an elastomeric polymer that is prepared from a monomer primarily composed of an alkyl acrylate, an alkyl methacrylate, dimethylsiloxane, or a diene compound.

Preferably, alkyl acrylate and acryl methacrylate each have an alkyl group having 2 to 10 carbon atoms. Examples of such compounds include ethyl acrylate, butyl acrylate, 2-ethylhexyl acrylate, and n-octyl methacrylate.

Examples of the core-shell-type elastomers primarily composed of these alkyl acrylates include polymers prepared by polymerization of 70 mass % or more alkyl acrylates and 30 mass % or less vinyl comonomers, such as methyl methacrylate, acrylonitrile, vinyl acetate, and styrene.

Examples of elastomers prepared from diene compounds include polybutadiene, elastomeric polymers containing acrylate and/or methacrylate, styrene-butadiene-styrene rubber (SBS), styrene-butadiene rubber (SBR), butadiene-acrylonitrile rubber, isoprene rubber, isoprene-styrene rubber, isoprene-acrylonitrile rubber, and ethylene-propylene rubber.

Polyfunctional monomers, such as divinylbenzene, ethylene dimethacrylate, triallyl cyanurate, and triallyl isocyanurate may be added as crosslinking agents, if necessary.

Examples of the vinyl monomer that is polymerized in the presence of the elastomeric polymer include aromatic vinyl compounds such as styrene and α-methylstyrene; acrylic esters such as methyl acrylate and ethyl acrylate; methacrylic esters such as methyl methacrylate and ethyl methacrylate; and vinyl cyanides such as acrylonitrile and methacrylonitrile.

These monomers may be used alone or in combination, or may be copolymerized with other vinyl monomers, for example, vinyl esters such as vinyl acetate and vinyl propionate. Polymerization may be carried out by any process, e.g., bulk polymerization, suspension polymerization and emulsion polymerization. Among these, emulsion polymerization is preferred.

It is preferred that the resulting core-shell-type elastomer contain 20 mass % or more elastomeric polymer. Examples of such a core-shell-type elastomer include MAS resin elastomers such as a graft copolymer of 60 to 80 mass % n-butyl acrylate with styrene and methyl methacrylate. For example, KM357P and EXL2315 (made by KUREHA CORPORATION) are commercially available.

A particularly preferred elastomer is a complex elastomer that is composed of a compound rubber having an average particle size of about 0.01 to 1 μm and at least one vinyl monomer graft-polymerized to the compound rubber, where the compound rubber contains 5 to 95 mass % polysiloxane rubber component and 95 to 5 mass % polyacryl(meth)acrylate rubber component that are mutually entangled and cannot be separated.

This complex elastomer has higher impact strength compared with a graft copolymer of each single rubber component. Examples of commercially available complex elastomers include Metablen S2001 (made by Mitsubishi Rayon Co. Ltd.). Examples of commercially available diene rubber include C223A (made by Mitsubishi Rayon Co. Ltd.) and EXL2603 (made by Rohm & Haas Japan K.K.).

The rubber-modified styrenic resins are impact resistant styrenic resins in which at least styrenic monomer is graft-polymerized to rubber components. Examples of rubber-modified styrenic resins include high-impact polystyrene (HIPS) in which styrene is polymerized to rubber such as polybutadiene and ABS resin in which acrylonitrile and styrene are polymerized to polybutadiene. These rubber-modified styrenic resins may be used in combination or as mixtures with styrenic resins unmodified with rubber.

The rubber-modified styrenic resin contains rubber component in an amount of 5 to 80 mass % and preferably 10 to 70 mass %. A rubber content of 5 mass % or more leads to sufficient impact strength. A rubber content of 80 mass % or less prevents a decrease in melt flowability, gel formation, and coloring, without decreased thermal stability.

Examples of the rubber include polybutadiene, elastomeric polymers containing acrylate and/or methacrylate, styrene-butadiene-styrene rubber (SBS), styrene-butadiene rubber (SBR), butadiene-acrylic rubber, isoprene rubber, isoprene-styrene rubber, isoprene-acrylic rubber, and ethylene-propylene rubber. Polybutadiene is particularly preferred.

The polybutadiene used herein may be low-cis polybutadiene (for example, 1 to 30 mole % 1,2-vinyl bond and 30 to 42 mole % 1,4-cis bond), high-cis polybutadiene (for example, 20 mole % or less 1,2-vinyl bond and 78 mole % or more 1,4-cis bond), or mixtures thereof.

Commercially available products include B600N (made by UBE CYCON, LTD.), DP-35 (made by Techno Polymer Co., Ltd.), and AT-05 (made by NIPPON A&L INC.).

The amount of the impact modifier to be compounded is preferably 30 mass % or less, more preferably 20 mass % or less, and most preferably 10 mass % or less of the total amount of the aromatic PC resin and impact modifier. An impact modifier content of 30 mass % or less to the total amount maintains satisfactory flowability.

If the flowability improver and the impact modifier are used in combination, the total amount of these should be 40 mass % or less to the total of the aromatic PC, the improver and the modifier. The ratio of the flowability improver to the impact modifier {(flowability improver):(impact modifier)} is preferably 1:0.07 to 0.7 and more preferably 1:0.1 to 0.5.

The component (B) of the PC resin composition in accordance with the present invention contains a silicate-containing inorganic filler or a mixture of 35 mass % or more silicate-containing inorganic filler and 65 mass % or less fibrous filler. The silicate-containing inorganic filler being the component (B) is preferably, but not limited to, at least one selected from talc, mica, zeolite, wollastonite, and lamellar silicates ion-exchanged with organic onium salts. Talc, which is hydrated magnesium silicate, may be of a natural product or a synthetic product. The content of iron oxide impurity is preferably 3 mass % or less in view of hue.

Mica usable in the present invention may be white mica, bronze mica, black mica, or artificial mica. Wollastonite is substantially represented by $CaSiO_3$ and generally contains about 50 mass % $SiO_2$, about 47 mass % CaO, and other components such as $Fe_2O_3$ and $Al_2O_3$. Wollastonite is prepared by pulverizing rude ore and classifying the powder. The preferable average diameter of talc, mica, and wollastonite ranges from 0.1 to 100 μm, and more preferably 0.1 to 50 μm in view of processability and appearance of the resulting molded product.

Zeolite, which is crystalline aluminosilicate, may be a natural or synthetic product. The average diameter thereof preferably ranges 0.1 to 5 μm.

The talc, mica, zeolite, and wollastonite may be modified with surface modifiers such as a silane coupling agent and a titanate coupling agent. Examples of the silane coupling agent include epoxy silane, amino silane, and vinyl silane.

Examples of titanate coupling agent include a monoalkoxy type, a chelate type, and a coordinate type.

The lamellar silicates ion-exchanged with organic onium salts in the component (B) are lamellar silicates interbedded with organic onium salts. Examples of preferred organic onium salts include alkyl onium salts, more specifically, ammonium ions, phosphonium ions, and sulfonium ions having 1 to 32 carbon atoms and preferably 1 to 18 carbon atoms; and onium ions derived from heterocyclic aromatic rings. The lamellar silicates interbedded with organic onium ions have a hydrocarbon structure with weak intermolecular force between the negatively charged silicate layers.

Examples of the ammonium ions include primary ammoniums, such as dodecylammonium, hexadecylammonium, and octadecylammonium; secondary ammoniums, such as methyldodecylammonium, butyldodecylammonium, and methyloctadecylammonium; tertiary ammoniums, such as dimethyldodecylammonium, dimethylhexadecylammonium, dimethyloctadecylammonium, diphenyldodecylammonium, and diphenyloctadecylammonium; quaternary ammoniums having identical alkyl groups, such as tetraethylammonium, tetrabutylammonium, and tetraoctylammonium; trimethylalkylammoniums, such as trimethyloctylammonium, trimethyldecylammonium, trimethyldodecylammonium, trimethyltetradecylammonium, trimethylhexadecylammonium, trimethyloctadecylammonium, trimethyleicosanylammonium, trimethyloctadecenylammonium, and trimethyloctadecadienylammonium; triethylalkylammoniums, such as triethyldodecylammonium, triethyltetradecylammonium, triethylhexadecylammonium, and triethyloctadecylammonium; tributylalkylammoniums, such as tributyldodecylammonium, tributyltetradecylammonium, dimethyldialkylammoniums, such as dimethyldioctylammonium, dimethyldidecylammonium, dimethylditetradecylammonium, dimethyldihexadecylammonium, dimethyldioctadecylammonium, dimethyldioctadecenylammonium, and dimethyldioctadecadienylammonium; diethyldialkylammoniums, such as diethyldidodecylammonium, diethylditetradecylammonium, diethyldihexadecylammonium, and diethyldioctadecylammonium; dibutyldialkylammoniums, such as dibutyldidodecylammonium, dibutylditetradecylammonium, dibutyldihexadecylammonium, and dibutyldioctadecylammonium; methylbenzyldialkylammoniums, such as methylbenzyldihexadecylammonium; dibenzyldialkylammoniums, such as dibenzyldihexadecylammonium; trialkylmethylammoniums, such as trioctylmethylammonium, tridodecylmethylammonium, and tritetradecylmethylammonium; trialkylethylammoniums, such as trioctylethylammonium and tridodecylethylammonium; trialkylbutylammoniums, such as trioctylbutylammonium and tridodecylbutylammonium; quaternary ammoniums having aromatic rings, such as trimethylbenzylammonium; and quaternary ammoniums derived from aromatic amines, such as trimethylphenylammonium.

Examples of the phosphonium ions include quaternary phosphonium ions, such as tetrabutylphosphonium, tetraoctylphosphonium, trimethyldecylphosphonium, trimethyldodecylphosphonium, trimethylhexadecylphosphonium, trimethyloctadecylphosphonium, tributyldodecylphosphonium, tributylhexadecylphosphonium, and tributyloctadecylphosphonium.

Among these compounds, ammonium salts are particularly preferred. Examples of the preferred ammonium salts include octadecylammonium, dimethyldioctadecylammonium, tributylhexylphosphonium, and dimethyldistearylammonium. Dimethyldistearylammonium is most preferred.

The use of the ammonium salts facilitates separation and dispersion of lamellar silicate layers by shearing force applied during melt kneading with a biaxial extruder in the production process of the aromatic PC resin.

The lamellar silicate treated with the organic onium salt can be produced by adding a quaternary ammonium salt in a large amount of water and then agitating the solution.

The amount of the organic onium salt used in processing the lamellar silicate generally ranges from 0.2 to 100 mass % of the cation-exchange capacity of the lamellar silicate.

Among the silicate-containing inorganic fillers in the component (B), plate talc is particularly preferred. Preferably its average diameter should range from 0.2 to 20 μm.

Examples of the fibrous filler in the component (B) include glass fiber, carbon fiber, and aluminum borate whiskers.

Preferred glass fiber may be made from high-alkali glass, low-alkali glass, and non-alkali glass. The length of the glass fiber ranges preferably from 0.1 to 8 mm, and more preferably from 0.3 to 6 mm. The diameter of the glass fiber ranges preferably 0.1 to 30 μm, and more preferably, 0.5 to 25 μm. The glass fiber may have any shape, for example, roving, milled fiber, or chopped strand.

The carbon fiber may be made from PAN (polyacrylonitrile) or pitch and should preferably be treated with a urethane binder.

The aluminum borate whiskers are represented by the general formula $nAl_2O_3 \cdot mB_2O_3$ (typically, $9Al_2O_3 \cdot 2B_2O_3$), and have an average diameter of 0.3 to 1.2 μm and an average length of 10 to 40 μm. Preferably, the surfaces of the whiskers should be treated with a silane coupling agent, a urethane resin, or an epoxy resin. Such whiskers are commercially available from SHIKOKU CHEMICALS CORPORATION (YS series).

If the silicate-containing inorganic filler and the fibrous filler are used in combination, the content of the fibrous filler to be compounded is 65 mass % or less, preferably, 55 mass % or less, more preferably 40 mass % or less, and most preferably 30 mass % or less in the component (B). A fibrous filler content of 65 mass % or less improves the rigidity and maintains the high flowability of the aromatic PC resin composition.

In the aromatic PC resin composition of the present invention, the proportion of the components (A) and (B) is 40 to 99 mass % component (A) and 60 to 1 mass % component (B); and preferably 50 to 97 mass % component (A) and 50 to 3 mass % component (B).

The aromatic PC resin composition of the present invention contains, as the component (C), mono- or di-ester of phosphoric acid having a polyoxyalkylene alkyl ether or polyoxyalkylene alkylaryl ether group, represented by formula (I):

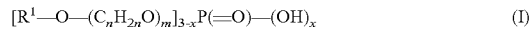

$$[R^1\text{—}O\text{—}(C_nH_{2n}O)_m]_{3-x}P(=O)\text{—}(OH)_x \qquad (I)$$

wherein $R^1$ represents an alkyl group having 1 to 18 carbon atoms or a substituted phenyl group having an alkyl group having 1 to 18 carbon atoms; n is 2 or 3; and x is 1 or 2.

Examples of the preferred polyoxyalkylene alkyl ether phosphate and polyoxyalkylene alkylallyl ether phosphate include polyoxyethylene (m=4 to 10) octyl ether phosphate (x=1 or 2), polyoxyethylene (m=4 to 10) nonyl ether phosphate (x=1 or 2), polyoxyethylene (m=4 to 10) decyl ether phosphate (x=1 or 2), polyoxyethylene (m=4 to 10) dodecyl ether phosphate (x=1 or 2), polyoxyethylene (m=4 to 10) tridecyl ether phosphate (x=1 or 2), polyoxyethylene (m=5 to 55) octylphenyl ether phosphate (x=1 or 2), polyoxyethylene (m=5 to 55) nonylphenyl ether phosphate (x=1 or 2), polyoxyethylene (m=5 to 55) dodecylphenyl ether phosphate (x=1 or 2), polyoxypropylene (m=4 to 10) octyl ether phosphate (x=1 or 2), polyoxypropylene (m=4 to 10) nonyl ether phosphate (x=1 or 2), polyoxypropylene (m=4 to 10) decyl ether phosphate (x=1 or 2), polyoxypropylene (m=4 to 10) dodecyl ether phosphate (x=1 or 2), polyoxypropylene (m=4 to 10) tridecyl ether phosphate (x=1 or 2), polyoxypropylene (m=5 to 55) octylphenyl ether phosphate (x=1 or 2), polyoxypropylene (m=5 to 55) nonylphenyl ether phosphate (x=1 or 2), and polyoxypropylene (m=5 to 55) dodecylphenyl ether phosphate (x=1 or 2). Among these phosphates, polyoxyethylene (m=4 to 10) tridecyl ether phosphate (x=1 or 2), polyoxyethylene (m=5 to 55) nonylphenyl ether phosphate (x=1 or 2), polyoxypropylene (m=4 to 10) tridecyl ether phosphate (x=1 or 2), and polyoxypropylene (m=5 to 55) nonylphenyl ether phosphate (x=1 or 2) are preferred.

The mono- or di-ester of phosphoric acid having a polyoxyalkylene alkyl ether or polyoxyalkylene alkylaryl ether group, component (C), represented by formula (I) may be used in an amount of 0.05 to 3 parts by mass, preferably 0.1 to 2 parts by mass, and more preferably 0.1 to 1.5 parts by mass relative to 100 parts by mass of the resin component containing the components (A) and (B). An amount of 0.05 parts by mass or more can sufficiently suppress a decrease in molecular weight of the PC resin, while an amount of 3 parts by mass or less can avoid a decrease in impact strength.

The aromatic PC resin composition of the present invention may contain appropriate amounts of ordinary additives used in thermoplastic resins, if necessary. Examples of such additives include phenolic antioxidants, phosphorus-based antioxidants, sulfur-based antioxidants, benzotriazole ultraviolet absorbers, benzophenone ultraviolet absorbers, hindered-amine light stabilizers (weatherproofers), antibacterial agents, solubilizers, and coloring agents such as dyes and pigments.

A method of producing the aromatic PC resin composition of the present invention is described. The aromatic PC resin composition of the present invention is prepared by kneading the components (A) to (C) with other optional components in proper proportions. Kneading may be carried out by primary mixing with a common kneading machine, such as, a ribbon blender, a drum tumbler, or a Henschel mixer, and then secondary mixing with, for example, a Banbury mixer, a uniaxial screw extruder, a biaxial screw extruder, a multiaxial screw extruder, or a cokneader. The heating temperature for mixing may be appropriately selected from the range of 240 to 300° C. The components other than the polycarbonate resin and styrenic resin may be added as a masterbatch that has been preliminarily produced by kneading with a PC resin.

Using the aromatic PC resin of the present invention, a variety of molded products can be produced with the kneading machines described above, or by injection molding, injection-compression molding, extrusion, blow molding, press molding, vacuum molding, or expansion molding after pelletization of the aromatic PC resin. Preferably, molded products should be produced by injection molding or injection-compression molding using pellets that are prepared by the kneading process. In the injection molding, gas injection molding may be applied in order to prevent surface sink or to reduce weight.

Examples of injection-molded products (including injection-compression molded products) produced from the aromatic PC resin composition of the present invention include housings and parts for office automation equipment, electric and electronic equipment, and household appliances, such as copying machines, facsimile telegraphs, television sets, radio receivers, tape recorders, video cassette recorders, personal computers, printers, telephone sets, information terminals, refrigerators, and electronic ovens; and other applications such as automobile parts, e.g., interior trims and outer panels.

EXAMPLES

The present invention will now be described by way of examples, but should not be limited to these examples.

Examples 1 to 18, Comparative Examples 1 to 18, and Reference Examples 1 to 3

The following compounding materials were used.

<Compounding Materials>
(A) Aromatic PC Resin
PC-1: FN1900A (made by Idemitsu Kosan Co., Ltd., viscosity average molecular weight Mv: 19600)
PC-2: FN2200A (made by Idemitsu Kosan Co., Ltd., viscosity average molecular weight Mv: 21100)
(B) Silicate-Containing Inorganic Filler
  Talc: TP-A25 (made by FUJI TALC INDUSTRIAL CO., LTD., average diameter: 4.9 µm)
  Mica: A-41 (made by YAMAGUCHI MICA CO., LTD., average diameter: 20.5 µm)
  Wollastonite: NYGLOS (made by NYCO MINERALS INC., average diameter: 5 µm)
  Ion-exchanged lamellar silicates: SOMASIF MAE (made by CO-OP CHEMICAL CO., LTD.)
(C) Polyoxyalkylene Alkyl Phosphate
C-1: ADECA COL PS-440E (made by Asahi Denka Kogyo K.K., polyoxyethylene alkyl ether phosphate content: 91 to 99 mass %)
C-2: ADECA COL CS-141E (made by Asahi Denka Kogyo K.K., phosphate ester containing polyoxyethylene nonylphenyl ether, specific gravity: 1.12, aromatic phosphate ester content: 90 mass % or more)
C-3: Phosphoric acid
(B) Fibrous Filler
Carbon fiber (CF): PYROFIL TR06U (made by Mitsubishi Rayon Co., Ltd.)
Glass fiber (GF): Glasslon chopped strand 03MA-409C (ASAHI FIBER GLASS Co., Ltd.)
(A) Flowability Improver
AS resin: acrylonitrile-styrene copolymer, MFR=38 g/10 min (200° C., load: 49 N)
Terpene resin: Clearon P105 (made by YASUHARA CHEMICAL CO., LTD.)
(A) Impact Modifier
Elastomer: EXL2603 (made by Rohm & Haas Japan K.K.)

These compounding materials were formulated according to Tables 1 to 5 and blended using a superflowter (Kawata Corporation, SFC-50). In Tables 1 to 5, formulations are represented by parts by mass. In every Example, Comparative Example, and Reference Example, 0.1 mass % IRGANOX 1076 (made by Ciba Specialty Chemicals Corporation) was added as an antioxidant.

The resulting blends were each kneaded with a biaxial extruder (made by TOSHIBA MACHINE CO., LTD., TEM-35, barrel temperature: 280° C.) to prepare pellets. The pellets were dried at 80° C. for 5 hours, and test pieces were made with an injection molding machine (made by TOSHIBA MACHINE CO., LTD., IS-100EN, resin temperature: 280° C.) and subjected to a flexure test (according to ASTM D-790), IZOD impact test (according to ASTM D-256), and a thermal deformation temperature test (according to ASTM D648, thickness: ⅛ inches (3.2 mm), load: 1.82 MPa). The following items (1) to (5) were also evaluated. The results are shown in Tables 1 to 5.

(1) Spiral Flow Length
The Archimedean length of the dried pellets was measured at a resin temperature of 280° C. and a thickness of 2 mm using an injection machine (made by TOSHIBA MACHINE CO., LTD., IS-45PV).

(2) Melt Flow Rate (MFR)
The melt flow rate was measured at a resin temperature of 280° C. and a load of 21.2 N according to ASTM D-1238.

(3) Measurement of Mold Shrinkage Factor
From the dried pellets, a flat plate (150×150×2 mm) was produced by molding at a resin temperature of 280° C. and a mold temperature of 40° C. with an injection molding machine (made by TOSHIBA MACHINE CO., LTD., IS-150E). After this plate was allowed to stand at 23° C. and 50% RH for 24 hours, the length (about 100 mm) between plus (+) marks transferred from the mold was measured with a profile projector (made by Nikon Corporation, V-24B) to calculate the mold shrinkage factors in the flow direction and its perpendicular direction and the ratio thereof.

(4) Viscosity Average Molecular Weight (Mv)

A small piece trimmed from pellets or molded article was dissolved in dichloromethane. After the insoluble residue was filtered out, polymer was recovered from the filtrate. The viscosity average molecular weight of the recovered polymer was measured according to ISO 1628-4:86.

(5) Whiteness and Color Difference

Using a flat plate (35×25×3 mm), which was sampled from the test piece for the flexure test, optical characteristics (L*, a*, and b*) were measured according to JIS K 7105 to determine whiteness and color difference. A larger value represents a larger whiteness. The color difference was calculated on the basis of that of a reference polycarbonate resin. A larger value represents a higher color density.

TABLE 1-1

|  | Reference Example 1 | Example 1 | Example 2 | Example 3 | Example 4 | Example 5 |
|---|---|---|---|---|---|---|
| PC-1 | 100 | 90 | 80 | 70 | 60 | 60 |
| Talc |  | 10 | 20 | 30 | 40 | 40 |
| C-1 |  | 0.2 | 0.5 | 0.75 | 1.3 | 2.0 |
| C-3 |  |  |  |  |  |  |
| Pellet Mv | 19600 | 18200 | 18000 | 17000 | 16600 | 17000 |
| Flexural modulus MPa | 2400 | 3500 | 5000 | 6500 | 7900 | 8100 |
| IZOD (notched) kJ/m$^2$ | 80 | 10 | 5 | 3 | 2 | 2 |
| Whiteness | 85 | 76 | 71 | 71 | 70 | 71 |
| ΔE | 0 | 8 | 13 | 15 | 16 | 15 |

TABLE 1-2

|  | Comparative Example 1 | Comparative Example 2 | Comparative Example 3 | Comparative Example 4 | Comparative Example 5 |
|---|---|---|---|---|---|
| PC-1 | 90 | 80 | 90 | 80 | 70 |
| Talc | 10 | 20 | 10 | 20 | 30 |
| C-1 |  |  | 0.2 | 0.5 | 0.75 |
| C-3 |  |  |  |  |  |
| Pellet Mv | 13000 | 11000 | 17900 | 17000 | 16000 |
| Flexural modulus MPa | 3400 | 4900 | 3300 | 4600 | 5700 |
| IZOD (notched) kJ/m$^2$ | 3 | 2 | 9 | 4 | 3 |
| Whiteness | 68 | 67 | 68 | 65 | 65 |
| ΔE | 13 | 16 | 19 | 21 | 20 |

TABLE 2-1

|  | Reference Example 2 | Example 6 | Example 7 | Example 8 | Example 9 | Example 10 |
|---|---|---|---|---|---|---|
| PC-1 | 100 | 88 | 80 | 70 | 60 | 88 |
| Mica |  | 12 | 20 | 30 | 40 |  |
| Wollastonite |  |  |  |  |  | 12 |
| C-1 |  | 0.4 | 0.5 | 0.75 | 1.0 |  |
| C-2 |  |  |  |  |  | 0.4 |
| Pellet Mv | 19600 | 19100 | 18600 | 18500 | 17700 | 17600 |
| Molded article Mv | 19500 | 18500 | 17900 | 17200 | 15000 | 16700 |
| Flexural modulus MPa | 2400 | 4000 | 5700 | 8200 | 11200 | 3200 |
| Izod (notched) kJ/m$^2$ | 80 | 11 | 5 | 3 | 2 | 6 |

TABLE 2-2

|  | Comparative Example 6 | Comparative Example 7 | Comparative Example 8 | Comparative Example 9 | Comparative Example 10 |
|---|---|---|---|---|---|
| PC-1 | 88 | 80 | 70 | 60 | 88 |
| Mica | 12 | 20 | 30 | 40 |  |
| Wollastonite |  |  |  |  | 12 |
| C-1 |  |  |  |  |  |
| C-2 |  |  |  |  |  |
| Pellet Mv | 17700 | 17100 | 15500 | 14400 | 16000 |
| Molded article Mv | 16700 | 15400 | 14000 | 12000 | 14500 |
| Flexural modulus MPa | 4000 | 5900 | 8530 | 10000 | 3200 |
| IZOD (notched) kJ/m$^2$ | 7 | 3 | 2 | 2 | 4 |

TABLE 3

|  | Reference Example 3 | Example 11 | Example 12 | Example 13 | Example 14 | Comparative Example 11 |
|---|---|---|---|---|---|---|
| PC-2 | 100 | 95 | 95 | 95 | 95 | 95 |
| Ion-exchanged lamellar silicate |  | 5 | 5 | 5 | 5 | 5 |
| C-1 |  | 1.0 | 0.5 | 0.23 | 0.2 |  |
| Pellet Mv | 21100 | 19000 | 18500 | 14500 | 13800 | 12200 |
| Molded article Mv | 21000 | 15300 | 14200 | 12600 | 12000 | 11700 |
| Flexural modulus MPa | 2400 | 3100 | 3100 | 3000 | 3000 | 3000 |
| IZOD(unnotched) kJ/m$^2$ | N.B | N.B. | N.B. | 100 | 85 | 47 |

TABLE 4

|  | Example 15 | Example 16 | Comparative Example 12 | Comparative Example 13 | Comparative Example 14 | Comparative Example 15 |
|---|---|---|---|---|---|---|
| PC-1 | 60 | 60 | 60 | 60 | 75 | 70 |
| CF | 10 | 20 | 10 | 20 | 25 | 30 |
| Mica | 30 | 20 | 30 | 20 |  |  |
| C-1 | 0.75 | 0.5 |  |  |  |  |
| Pellet Mv | 17400 | 18400 | 15000 | 16600 | 19000 | 18500 |
| Flexural modulus MPa | 15100 | 17700 | 15100 | 17800 | 15000 | 16500 |
| IZOD (notched) kJ/m$^2$ | 6 | 7 | 2 | 2 | 7 | 7 |
| Thermal deformation temp. °C. | 135 | 139 | 135 | 139 | 145 | 145 |
| MFR g/10 min | 7 | 4 | 9 | 7 | 4 | 2 |
| Spiral flow cm | 40 | 27 | 50 | 35 | 18 | 17 |
| Molding shrinkage |  |  |  |  |  |  |
| Flow direction (%) | 0.227 | 0.147 | 0.23 | 0.147 | 0.150 | 0.143 |
| Perpendicular direction (%) | 0.366 | 0.377 | 0.374 | 0.392 | 0.502 | 0.492 |
| Flow direction/perpendicular direction | 0.621 | 0.391 | 0.615 | 0.375 | 0.299 | 0.293 |

The PC resin compositions of Examples 15 and 16 containing both the carbon fiber and mica as fillers exhibit higher flowability and rigidity than those of the PC resin compositions of Comparative Examples 14 and 15 containing only carbon fiber as filler. More particularly, the PC resin compositions of Examples 15 and 16 exhibit high rigidity and small molding shrinkage anisotropy and can be produced at low cost because the high-cost carbon content can be reduced by combined use with mica.

TABLE 5

|  | Example 17 | Example 18 | Comparative Example 16 | Comparative Example 17 | Comparative Example 18 |
|---|---|---|---|---|---|
| PC-1 | 68 | 68 | 68 | 68 | 68 |
| AS resin | 5 | 5 | 5 | 5 | 5 |
| Terpene resin | 2 | 2 | 2 | 2 | 2 |
| Elastomer | 1 | 1 | 1 | 1 | 1 |
| GF |  | 7 |  | 7 | 20 |
| Talc | 4 | 4 | 4 | 4 | 4 |
| Mica | 20 | 13 | 20 | 13 |  |
| C-2 | 0.3 | 0.5 |  |  |  |
| Flexural modulus MPa | 5900 | 6100 | 6000 | 6200 | 6300 |
| IZOD (notched) kJ/m$^2$ | 10 | 10 | 4 | 4 | 10 |
| Thermal deformation temp. °C. | 125 | 137 | 125 | 136 | 139 |
| MFR g/10 min | 17 | 14 | 22 | 18 | 10 |
| Spiral flow cm | 29 | 28 | 32 | 29 | 25 |
| Molding shrinkage |  |  |  |  |  |
| Flow direction (%) | 0.428 | 0.414 | 0.413 | 0.408 | 0.371 |
| Perpendicular direction (%) | 0.450 | 0.482 | 0.464 | 0.513 | 0.554 |
| Flow direction/perpendicular direction | 0.951 | 0.859 | 0.890 | 0.795 | 0.670 |

The PC resin composition of Example 18, having a mica content which is 7 parts by mass less than that of the PC resin composition of Example 17 and containing 7 parts by mass of glass fiber, shows slightly greater molding shrinkage anisotropy, a higher thermal deformation temperature than those of Example 17, this thermal deformation temperature being comparable with the PC resin composition of Comparative Example 18 containing 20 parts by mass of glass fiber. Furthermore, the PC resin composition of Example 18 exhibits significantly improved molding shrinkage anisotropy and higher flowability than that of the PC resin composition of Comparative Example 18.

INDUSTRIAL APPLICABILITY

According to the PC resin composition of the present invention, a decrease in molecular weight of the PC resin is suppressed and impact strength is significantly improved while the rigidity is maintained. Articles produced by injection molding (including injection-compression molding) using the PC resin composition include housings and parts for office automation equipment, electric and electronic equipment, and household appliances, such as copying machines, facsimile telegraphs, television sets, radio receivers, tape recorders, video cassette recorders, personal computers, printers, telephone sets, information terminals, refrigerators, and electronic ovens; and other applications such as automobile parts, e.g., interior trims and outer panels.

The invention claimed is:

1. An aromatic polycarbonate resin composition comprising:
an admixture comprising 40 to 99 mass % of (A) and 60 to 1 mass % of (B), wherein
(A) a mixture of 60 mass % or more of an aromatic polycarbonate resin and 40 mass % or less including 0% of (1) a flowability improver which is at least one selected from an acrylonitrile-styrene resin and a terpene resin, wherein the acrylonitrile-styrene resin has a melt flow rate (MFR) of 5 g/10 min or more at 200° C. under a load of 49 N and a content of acrylonitrile segments in the acrylonitrile-styrene resin ranges from 15 to 40 mass %, and (2) an impact modifier which is a core-shell graft elastomer, wherein if present, the ratio of the flowability improver to the impact modifier is 1:0.07 to 0.7, and
(B) silicate-containing inorganic filler or mixture of 35 mass % or more of silicate-containing inorganic filler and 65 mass % or less including 0% of fibrous filler; and
(C) a mono- or di-ester of phosphoric acid having a polyoxyalkylene alkyl ether or polyoxyalkylene alkylaryl ether group represented by Formula (I):

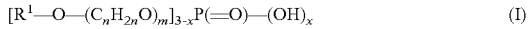
(I)

wherein $R^1$ represents an alkyl group having 1 to 18 carbon atoms or a substituted phenyl group having an alkyl group having 1 to 18 carbon atoms; n is 2 or 3; and x is 1 or 2, in an amount sufficient to suppress a decrease in molecular weight of the aromatic polycarbonate resin of component (A) due to the presence of component (B), and
wherein the mono- or di-ester of phosphoric acid having a polyoxyalkylene alkyl ether or polyoxyalkylene alkylaryl ether group is at least one compound selected from the group consisting of
polyoxyethylene (m=4 to 10) octyl ether phosphate (x=1 or 2),
polyoxyethylene (m=4 to 10) nonyl ether phosphate (x=1 or 2),
polyoxyethylene (m=4 to 10) decyl ether phosphate (x=1 or 2),
polyoxyethylene (m=4 to 10) dodecyl ether phosphate (x=1 or 2),
polyoxyethylene (m=4 to 10) tridecyl ether phosphate (x=1 or 2),
polyoxyethylene (m=5 to 55) octylphenyl ether phosphate (x=1 or 2),
polyoxyethylene (m=5 to 55) nonylphenyl ether phosphate (x=1 or 2),
polyoxyethylene (m=5 to 55) dodecylphenyl ether phosphate (x=1 or 2),
polyoxypropylene (m=4 to 10) octyl ether phosphate (x=1 or 2),
polyoxypropylene (m=4 to 10) nonyl ether phosphate (x=1 or 2),
polyoxypropylene (m=4 to 10) decyl ether phosphate (x=1 or 2),
polyoxypropylene (m=4 to 10) dodecyl ether phosphate (x=1 or 2),
polyoxypropylene (m=4 to 10) tridecyl ether phosphate (x=1 or 2),
polyoxypropylene (m=5 to 55) octylphenyl ether phosphate (x=1 or 2),
polyoxypropylene (m=5 to 55) nonylphenyl ether phosphate (x=1 or 2), and
polyoxypropylene (m=5 to 55) dodecylphenyl ether phosphate (x=1 or 2).

2. The aromatic polycarbonate resin composition according to claim 1, wherein the silicate-containing inorganic filler in the component (B) is at least one selected from talc, mica, zeolite, wollastonite, and lamellar silicates ion-exchanged with organic onium salts.

3. The aromatic polycarbonate resin composition according to claim 1, wherein the fibrous filler in the component (B) is present and is at least one selected from glass fiber, carbon fiber, and aluminum borate whiskers.

4. An aromatic polycarbonate resin molding prepared by molding the aromatic polycarbonate resin composition according to claim 1.

5. A method of preparing an aromatic polycarbonate resin molding comprising molding the aromatic polycarbonate resin composition according to claim 1.

6. The aromatic polycarbonate resin composition according to claim 1, wherein the aromatic polycarbonate resin is derived from a bis(hydroxyphenyl)alkane.

7. The aromatic polycarbonate resin composition according to claim 1, wherein the aromatic polycarbonate resin has a viscosity average molecular weight ranging from about 10,000 to 50,000.

8. The aromatic polycarbonate resin composition according to claim 1, wherein the aromatic polycarbonate resin comprises a polycarbonate-polyorganosiloxane copolymer.

9. The aromatic polycarbonate resin composition according to claim 1, wherein the flowability improver is present in an amount of 30 mass % or less based on the total amount of the aromatic polycarbonate resin and the flowability improver.

10. The aromatic polycarbonate resin composition according to claim 1, wherein the impact modifier is present in an amount of 30 mass % or less based on the total amount of the aromatic polycarbonate resin and the impact modifier.

11. The aromatic polycarbonate resin composition according to claim 1, wherein the ratio of the flowability improver to the impact modifier is 1:0.1 to 0.5.

12. The aromatic polycarbonate resin composition according to claim 1, wherein component (A) is present in an amount of 50 to 97 mass %, and component (B) is present in an amount of 50 to 3 mass %.

13. The aromatic polycarbonate resin composition according to claim 1, wherein component (C) is present in an amount of 0.1 to 2 parts by mass relative to 100 parts by mass of components (A) and (B).

14. The aromatic polycarbonate resin composition according to claim 1, wherein component (C) is present in an amount of 0.1 to 1.5 parts by mass relative to 100 parts by mass of components (A) and (B).

15. The aromatic polycarbonate resin composition according to claim 1, wherein component (C) is present in an amount of 0.05 to 3 parts by mass relative to 100 parts by mass of components (A) and (B).

* * * * *